Oct. 29, 1968    H. J. NIHOF ET AL    3,408,488
SQUARE ROOT COMPUTING CIRCUIT
Filed March 26, 1965

INVENTORS:
HENDRIKUS J. NIHOF
AART BIJL
ALBERTUS C. H. BORSBOOM
BY:
THEIR ATTORNEY

United States Patent Office 3,408,488
Patented Oct. 29, 1968

3,408,488
SQUARE ROOT COMPUTING CIRCUIT
Hendrikus J. Nihof and Aart Bijl, Amsterdam, Netherlands, and Albertus C. H. Borsboom, Oakland, Calif., assignors to Shell Oil Company, New York, N.Y., a corporation of Delaware
Filed Mar. 26, 1965, Ser. No. 442,914
Claims priority, application Netherlands, Mar. 31, 1964, 6403441
6 Claims. (Cl. 235—193.5)

ABSTRACT OF THE DISCLOSURE

A circuit for producing an output signal corresponding to the square root of the product of two input signals wherein one signal is supplied to a first integrating amplifier while the second signal is used to charge a storage capacitor. When the voltage level of the first integrating amplifier reaches a selected level, it actuates a switch means to couple the storage capacitor to a second integrating amplifier. The output signal of the second integrating amplifier is used to charge a second storage capacitor that is coupled to the first integrating amplifier by the actuation of the switch means.

---

Figure 1:
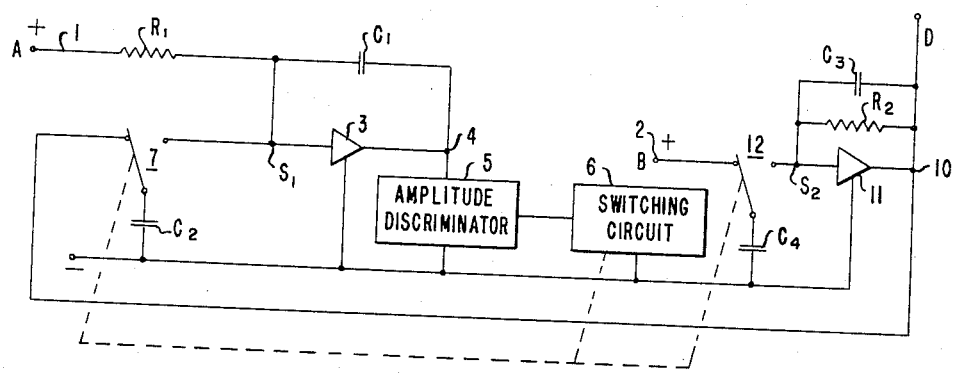

This invention relates to a method and apparatus of producing an electrical signal corresponding to the square root of the product of a pair of input signals. More particularly, this invention relates to an improved system for measuring the mass flow of a fluid in a pipeline utilizing the method and apparatus according to the invention.

In the processing of measured data, for example, as originates from laboratory analyses or from operating plants, the need often occurs for quickly and accurately extracting or determining the square root of the measured data. Such need occurs particularly with respect to measured data originating from a continuously operating process, wherein the measured data is present as continuous and variable signals in order that the resulting signal can be used to produce continuous measurements and/or control of the process. Moreover, it also often occurs that the particular measurement or control operation requires that the signal whose square root is desired be in fact the product or quotient of a pair of measured signals. In such cases, it is necessary that the two signals be initially multiplied to obtain the quotient. Such quotient signals are required, for example, when the measured variable must be corrected for variations in pressure, temperature, composition, etc.

Although methods and apparatus for extracting the square root from a signal are well known and commercially available, it has been found that the accuracy of the square root extraction in some prior art devices is not more than about 0.3 percent of the maximum scale value of the measuring system. While this degree of accuracy is acceptable in many instances, in certain applications where extreme accuracy is desired, this degree of accuracy is not sufficient. Moreover, none of the commercially available square root detecting apparatuses include means which are capable of extracting the square root from the product of a pair of input signals but requires some additional equipment in order to provide for the multiplication of the two signals, thus introducing another possible area for introducing error into the system.

One particular area wherein a problem of extracting the square root from the product of a pair of input signals is of particular importance is with respect to the measurement of the mass flow of a fluid such as a gas or a liquid. In such operations, continuous signals related to the instantaneous flow and the density of the fluid are combined in order to correct the flow indication to standard conditions. Although by far the simplest type of flow meter which could be used for measuring the flow is an orifice type meter of the flange or plate type, such meters produce an output signal proportional to the square of the velocity of the measured fluid and hence requires a square root extraction in order to arrive at the desired form of the data, i.e., a signal proportional to the velocity or flow. Consequently, where accurate and rapid determination of the flow is desired, such meters have not generally been used in the past; and instead, systems utilizing flow meters which produce output signals directly proportional to the velocity or flow of the liquid or gas that has been used, for example, see as shown in the U.S. Patent 3,089,643, issued May 14, 1963. Although flow meters which would produce an output signal directly proportional to the flow of the measured fluid are well known in the art, such meters are very expensive, particularly where large quantities of gas or liquid are to be measured. In fact, for very large quantities of flowing fluid, such as occur in oil or gas fields or in oil refineries, meters of this type are not generally available. Through the use of applicants' novel circuit arrangement whereby a signal corresponding to the square root of the product of a pair of input signals may be rapidly and accurately obtained, it is now possible for the above-mentioned problems inherent in the prior art to be eliminated, i.e., relatively cheap orifice type meters of the flange or plate type may be used for the signal corresponding to the flow of fluid in the pipeline, resulting in a substantial saving in cost with improved accuracy.

In accordance with applicants' invention, the signal corresponding to the square root of a pair of input signals is produced by: continuously applying one of the pair of input signals via an input resistance to the input terminal of a first operational amplifier having a feedback capacitor connected between its input and output terminals; charging a first storage capacitor with the output signal from a second operational amplifier having a parallel resistance-capacitance network connected between its input and output terminals; charging a second storage capacitor with the second of said pair of input signals; detecting the output signal from the first operational amplifier; and each time the output signal from the first operational amplifier is above a predetermined value, simultaneously (1) applying the voltage on the first storage capacitor to the input of the first operational amplifier, thereby resetting said first operational amplifier; and (2) applying the voltage on the second of said storage capacitors to the input of said second operational amplifier. The output signal from the second operational amplifier is then the desired signal corresponding to the square root of the product of the pair of input signals. If the desired output signal is to correspond to the mass flow of a fluid corrected to standard conditions, then the pair of input signals would correspond to the output signals from a meter for measuring the density of the fluid and a flow meter of the orifice type.

A computing circuit suitable for carrying out the method according to the invention comprises a first operational amplifier having a feedback capacitor connected between its input and output terminals and one of the pair of input signals to the circuit connected to the input of the operational amplifier via a series input resistance; a second operational amplifier having a parallel resistance-capacitance network connected between its output and input terminals; first and second storage capacitors which are normally connected via individual switching means to the output of the second operational amplifier and to the second of the input signals to the circuit, respectively, to thereby charge the capacitors with the respective voltages; amplitude responsive means for detecting a preselected output from the first operational amplifier and means responsive to said amplitude responsive means for simultaneously actuating the respective switch means to apply the charges on the first and second storage capacitors to the inputs of the first and second operational amplifiers, respectively, each time the predetermined output from the first operational amplifier is detected, whereby the output signal from the second operational amplifier is the desired signal corresponding to the square root of the product of the two input signals to the circuit.

Figure 2:
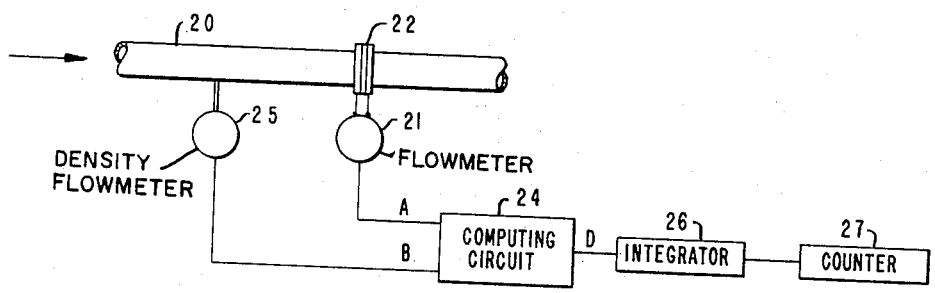

The invention and the advantages thereof will be more readily understood from the following detailed description when taken in conjunction with the attached drawings wherein:

FIGURE 1 is a schematic diagram of a computing circuit for extracting the square root from the product of a pair of input signals according to the invention; and FIGURE 2 is a block diagram of a mass flow meter which incorporates the computing circuit of FIGURE 1.

Referring now to FIGURE 1, there is shown an embodiment of applicants' novel computing circuit for determining the square root of the product of a pair of input signals A and B. As indicated, the circuit has a pair of input terminals 1 and 2 to which the electrical input signals A and B are fed, respectively. Connected in series with the input terminal 1 via a series input resistance $R_1$ is the summing junction or input terminal $S_1$ of an operational amplifier 3, that is, a D.C. electronic amplifier with a very high negative gain.

The amplifier 3 is provided with a feedback capacitor $C_1$ connected between its output terminal 4 and its input terminal or summing junction $S_1$ whereby the amplifier 3, resistor $R_1$ and capacitor $C_1$ effectively act as an integrator to integrate the input signal A applied to terminal 1 with respect to time.

Connected to the output terminal 4 of amplifier 3 is an amplitude discriminator 5 which is adjusted to produce an output pulse whenever the voltage at the output terminal 4 reaches a preselected value. Such an amplitude discriminator may, for example, be a gas discharge tube such as a neon tube or a thyratron, which breaks down when the voltage between the electrodes exceeds a minimum value, a biased diode or a Schmitt trigger.

The output signal from the amplitude discriminator 5, which consists of a series of pulses of a frequency $f$, are fed to a switching circuit 6, which controls the positioning of a switch 7. In response to an output pulse from the amplitude discriminator 6, circuit 7 momentarily shifts the position of switch 7 from a first normal position whereat a storage capacitor $C_2$ is connected to the output terminal 10 of an operational amplifier 11, to a second position whereat the capacitor $C_2$ is connected to the summing junction $S_1$. In its first position, switch 7 permits capacitor $C_2$ to be charged to a voltage corresponding to the output voltage of the amplifier 11 whereas in its second position, switch 7 applies the voltage on capacitor to the summing junction $S_1$ of amplifier 3. Since the output voltage of operational amplifier 11 and consequently the charge on capacitor $C_2$ is of a polarity opposite to the normal input voltage of amplifier 3, discharging the condenser $C_2$ into summing junction $S_1$ causes the output voltage from the amplifier 3 to be reset to a value below the predetermined value to which the amplitude discriminator 6 is responsive, thereby effectively conditioning the discriminator 5 for subsequent actuation. The result of this action is that the capacitor $C_2$ is continuously being alternately charged with the output of the amplifier 11 and discharged via junction $S_2$ at a frequency determined by the output pulses from discriminator 6.

Also controlled by the output pulses from discriminator 5 via switching circuit 6 is a second switch 12 which is alternately switched between first and second positions simultaneously with the positioning of switch 7. In its first position switch 12 connects a storage capacitor $C_4$ to input terminal 2, thereby charging capacitor $C_4$ to the value of input signal B, whereas in its second position, switch 12 connects capacitor $C_4$ to the input terminal or summing junction $S_2$ of operational amplifier 11 which has a parallel resistance-capacitance feedback network, consisting of resistor $R_2$ and capacitor $C_3$, connected between its output and input terminals 10 and $S_2$, respectively, thereby discharging the capacitor $C_4$ via summing junction $S_2$. The average discharge current through resistor $R_2$, resulting from the periodic discharge of capacitor $C_4$ at a frequency $f$ into summing junction $S_2$, generates the desired output signal D at the output terminal 10, i.e., the signal proportional to the square root of the product of the pair of input signals A and B.

In order to show that the output signal D is the desired signal, it must be understood that by providing for feedback over the operational amplifiers 3 and 11 via elements $C_1$ and $R_2C_3$, respectively, it is ensured that the voltage at the input of the amplifiers is substantially equal to zero; and consequently the voltage at the summing junctions $S_1$ and $S_2$ therefore continuously has a value being substantially equal to zero. Additionally, since the input current to an operational amplifier is by definition very small, as far as the amplifiers are concerned the input currents can be neglected.

Accordingly, for summing junction $S_1$ it then holds that, averaged over time:

$$\frac{A}{R_1} = D \cdot C_2 \cdot f \qquad (1)$$

where $f$ represents the switching frequency of switches 7 and 12.

Likewise, for summing junction $S_2$ it is true that, averaged over time:

$$\frac{D}{R_2} = B \cdot C_4 \cdot f \qquad (2)$$

From Equations 1 and 2 it follows by elimination of $f$: that $D = K_1 \sqrt{A.B}$, where $$K_1 = \sqrt{\frac{R_2 C_4}{R_1 C_2}} \qquad (3)$$

from which it is evident that D is the desired signal, i.e., the signal proportional to the square root of the product of a pair of input signals.

The following table gives recommended values for various components and voltages:

| | | |
|---|---|---|
| $R_1$ | megohm | 1 |
| $R_2$ | do | 1 |
| $C_1$ | microfarads | 3.3 |
| $C_2$ | do | 0.1 |
| $C_3$ | do | 4 |
| $C_4$ | do | 0.2 |
| A | volts | 0–20 |
| B | do | 0–20 |
| D | do | 0–20 |
| $f$ (max.) | c./s. | 10 |

It is understood that since the amplifiers 3 and 11 are direct-current amplifiers, it is desirable to provide the amplifiers with a correction for drift, which in itself is known. In this way it is ensured that the zero of the amplifier does not drift with time.

Utilizing the values given above in the circuit of FIGURE 1, it has been found that at a range of 10:1 an accuracy of 0.12% is achieved. This is considerably better than that attainable with the prior art methods of square root extraction.

As stated above, the calculation of $D = K_1 \sqrt{A.B}$ is of great importance in the processing of measured data originating from gases or liquids and that the use of the instant invention presents a considerable advantage in determining the mass flow of a gas or of a liquid if the signal A is derived from an orifice meter of the flange or plate type for the gas or liquid flow and the signal B from a density meter for that flow. Such a mass flow meter arrangement is illustrated in FIGURE 2 wherein reference numeral 20 indicates a flow line 20 through which the gas or the liquid is flowing. A meter 21 is provided to measure the pressure drop across an orifice plate 22 mounted in the flow line 20 to produce an electrical output signal (A) which is proportional to $\rho V^2$ where $\rho$ is the density and V the velocity of the gas or the liquid in flow line 20. The output of meter 21 is fed to one input of a computing circuit 24 as shown in FIGURE 1 in order to calculate $\sqrt{A.B}$ by the method according to the invention. Connected to the other input of the computing circuit 24 is the electrical output signal (B) of a meter 25 which is proportional to the density $\rho$ of the fluid in the flow line 20. Accordingly, the output signal (D) from the computing circuit 24 is equal to $K.\rho.V$, where K is a constant. Consequently, the output signal D is proportional to the mass flow of the gas or of the liquid.

It is further advantageous for the integrated or total value of the mass flow or the gas or the liquid or of the signal D to be obtained. This is preferably done by converting the signal obtained for the mass flow or for the signal D into a pulse-shaped signal the frequency of which is proportional to the instantaneous value of the signal for the mass flow or for the signal D by means of an integrating circuit 26 and then counting the number of pulses by means of a counter 27.

An integrator of this type is shown, for example, in U.S. Patent No. 3,048,336, issued Aug. 7, 1962, which disclosure is incorporated herein.

The combination of the mass flow meter and the integrator according to the invention can very advantageously be applied to the determination of the quantity of gas supplied in volumes up to, for instance, $5 \times 10^6$ normal cubic meters per day, such as occur in the production and distribution of natural gas. For these volumes, the maximum systematic error, expressed in percent of the maximum value of the measuring range, has been found to be smaller than 0.15%, it being possible for the measuring range to vary by a factor of 10. Orifice plates of different size can be applied here.

With such a metering arrangement, it is now possible for the price of the quantity of gas supplied to be determined with a very small error. As the composition of the gas varies little, if at all, the calorific value of the gas does not vary either. The price of the quantity of gas supplied that has been calculated from the mass flow is then also essentially based on the calorific value of the gas, thus presenting a further advantage of the flow meter of FIGURE 2.

It is to be understood that while the invention has been described utilizing two variable electrical input signals, the invention is not limited to use with two such input signals. One of the two input signals may be constant, for example, for the purpose of scaling.

Obviously, various other modifications of the invention are possible in the light of the above teachings. For example, the switches 7 and 12 may be replaced with equivalent electronic circuitry having no moving parts. It is therefore to be understood that the invention is not limited to the particular form illustrated but is capable of embodiment in other forms within the scope of the claims.

We claim as our invention:

1. A circuit for producing an output signal corresponding to the square root of the product of first and second input signals comprising:
   a first operational amplifier having a feedback capacitance connected between its input and output terminals and said first input signal being applied to the input thereof via an input resistance;
   a second operational amplifier having a feedback network connected between its input terminals, said network including a resistance and a capacitance connected in parallel; and
   amplitude responsive means connected to the output of said first operational amplifier for simultaneously applying, each time the output signal from said first operational amplifier reaches a predetermined value, (1) a voltage corresponding to the second of said input signals to the input of said second operational amplifier, and (2) a voltage corresponding to the output of said second operational amplifier to the input of said first operational amplifier, thereby resetting said first operational amplifier, whereby the output signal from said second operational amplifier is the desired output signal corresponding to the square root of the product of said first and second input signals.

2. A circuit for producing an output signal corresponding to the square root of the product of a pair of input signals comprising:
   a first operational amplifier having a feedback capacitor connected between its input and output terminals and one of said input signals connected to its input terminal via an input resistance;
   a second operational amplifier having a parallel resistance-capacitance feedback network connected between its input and output terminals;
   first and second storage capacitors;
   first switch means normally connecting said first storage capacitor to the output of said second operational amplifier to charge said first storage capacitor to the output voltage of said second operational amplifier;
   second switch means normally connecting said second storage capacitor to an input terminal for the other of said pair of input signals to charge said second storage capacitor; and
   amplitude responsive means connected to the output of said first operational amplifier for simultaneously actuating said first and second switch means to apply the voltage stored on said first and second storage capacitors to the inputs of said first and second operational amplifiers, respectively, whenever the output signal from said first operational amplifier exceeds a predetermined value, and for returning said switch means to their normal positions when the output of said first operational amplifier is below said predetermined value, whereby the output signal from said second operational amplifier is the desired signal corresponding to the square root of the product of said pair of input signals.

3. The apparatus of claim 2 including:
   a fluid flow line;
   a flow meter for measuring the flow in said flow line and producing an output signal proportional to the square of the velocity of the fluid flowing in said flow line; and
   a density meter for measuring the density of the fluid flowing in said flow line and producing an output signal proportional thereto, said output signals from said flow meter and said density meter constituting said pair of input signals to said circuit, whereby the amplitude of the output signal from said second operational amplifier is proportional to the mass flow of the fluid.

4. The apparatus of claim 3 wherein said flow meter is an orifice meter.

5. The apparatus of claim 3 including means for integrating the output signal from said second operational amplifier with respect to time to produce a train of output pulses the frequency of which is proportional to the instantaneous amplitude of said output signal from said second operational amplifier; and counting means connected to the output of said integrating means for counting said output pulses to produce an indication of the total mass flow of fluid flowing in said flow line.

6. In an electrical circuit including a first operational amplifier having a capacitor connected between its input and output terminals; a second operational amplifier having a parallel resistance-capacitance network connected between its input and output terminals; and first and second storage capacitors, the method of obtaining an output signal corresponding to the square root of the product of a pair of input signals comprising:

continuously applying one of said pair of input signals to the input of said first operational amplifier via an input resistance;

charging a first of said pair of storage capacitors with the output voltage from said second operational amplifier;

charging the other of said pair of storage capacitors with the second of said input signals; and applying the voltages on said first and second storage capacitors to the inputs of said first and second operational amplifiers, respectively, each time the output voltage from said first operational amplifier is above a predetermined value, whereby the output signal from the second operational amplifier is the desired signal corresponding to the square root of the product of said pair of input signals.

References Cited

UNITED STATES PATENTS 3,016,197  1/1962  Newbold ———————— 235—193.5 X
3,070,302  12/1962  Fluegel et al. ———————— 235—151.34
3,333,468  8/1967  Jacobs.

MALCOLM A. MORRISON, *Primary Examiner.*

J. F. RUGGIERO, *Assistant Examiner.*